United States Patent [19]

Nishimura et al.

[11] Patent Number: 4,724,527
[45] Date of Patent: Feb. 9, 1988

[54] ELECTRONIC PERSONAL ASSET CONTROL DEVICE

[75] Inventors: Kosuke Nishimura; Yoshiro Kataoka, both of Yamatokoriyama, Japan

[73] Assignee: Sharp Kabushiki Kaisha, Osaka, Japan

[21] Appl. No.: 940,169

[22] Filed: Dec. 10, 1986

Related U.S. Application Data

[63] Continuation of Ser. No. 547,429, Oct. 31, 1983, abandoned.

[30] Foreign Application Priority Data

| Nov. 5, 1982 | [JP] | Japan | 57-195435 |
| Nov. 5, 1982 | [JP] | Japan | 57-195436 |
| Nov. 5, 1982 | [JP] | Japan | 57-195437 |
| Nov. 5, 1982 | [JP] | Japan | 57-195438 |
| Nov. 5, 1982 | [JP] | Japan | 57-195439 |

[51] Int. Cl.⁴ ............................................. G06F 15/30
[52] U.S. Cl. .................................................. 364/705
[58] Field of Search ................ 364/705, 709, 710, 715

[56] References Cited

U.S. PATENT DOCUMENTS

| 3,920,979 | 11/1975 | Kilby et al. | 364/705 |
| 4,075,702 | 2/1978 | Davies | 364/705 |
| 4,222,109 | 9/1980 | Siwula | 364/715 |
| 4,224,675 | 9/1980 | Pinkerman | 364/705 |
| 4,301,511 | 11/1981 | Shimizu et al. | 364/709 |

Primary Examiner—David H. Malzahn
Attorney, Agent, or Firm—Birch, Stewart, Kolasch & Birch

[57] ABSTRACT

An asset control device comprising an input keyboard for entering information of transactions including the amount of a check and that of deposit, a current balance storage, an opening balance storage, a transaction storage for registering the serial number of a check and the amount thereof each time the check is drawn or the amount of money deposited each time the deposit of money is effected, a calculator operable to subtract the amount of check stored in the transaction storage from the opening balance or to add the amount of the deposited money stored in the transaction storage to the opening balance, and a display unit for sequentially displaying the transaction information and the result of calculation performed by the calculator.

9 Claims, 22 Drawing Figures

Fig. 6

| n | N (CK.NO.) | M (AMOUNT) |
|---|---|---|
| 0 | N0 | M0 |
| 1 | N1 | M1 |
| 2 | N3 | M2 |
| 3 | N4 | M3 |
| ⋮ | ⋮ | ⋮ |
| 28 | N28 | M28 |
| 29 | N29 | M29 |

MA

| A |
|---|
| B |
| C |
| D |
| E |

} MB (for CARD)

| O (OPENING BAL) |
|---|
| P (CURRENT BAL) |
| Q (MINIMUM BAL) |
| R (LAST CHECK NO) |

} MC (for CK BOOK)

| X |
|---|
| Y |
| Z |
| W |
| M |

} MD (for CALCULATOR)

| n | d | b | |
|---|---|---|---|

} ME

ELECTRONIC PERSONAL ASSET CONTROL DEVICE

This is a continuation of application Ser. No. 547,429, filed on Oct. 31, 1983, now abandoned.

BACKGROUND OF THE INVENTION

The present invention relates to a hand-held, electronic personal asset control device for enabling the user to keep up his or her record of monetary transactions with his or her bank account.

The U.S. Pat. No. 4,222,109 discloses this type of personal asset control device. This known personal asset control device comprises an input keyboard for entering information of monetary transactions including those of checks and those of bank deposits, a current balance storage means for storing information of the current balance, and means for updating the current balance each time the information of monetary transactions is entered. With this device, the user can ascertain the current balance at any desired time with no need to make reference to the specification of the transactions which the bank may issue regularly to the user.

However, the prior art device of the type referred to above merely performs a calculation of the amount of money transacted to give the current balance which is in turn stored in the storage means as updated information. Accordingly, in the event of the occurrence of any discrepancy between the current balance calculated by the asset control device and that described in the banker's specification, no one can ascertain whether the discrepancy is the result of errors on the part of the bank or whether it is the result of erroneous manipulation of the asset control device done by the user and, also, no one can find out items of transaction that have resulted in the discrepancy.

In addition, with the prior art asset control device, the user has no way to ascertain whether or not the current balance calculated by and recorded in the asset control device has broken the minimum deposited fund or minimum balance, and therefore, the prior art asset control device cannot be used for the control of the dealing with checks. The minimum deposited fund or minimum balance is the minimum amount of money required for the user to deposit or keep deposited so that the user can draw checks at any time sans frais, i.e., with no banker's commission required, so long as the total amount of the checks does not break such minimum amount of money.

SUMMARY OF THE INVENTION

The present invention has been developed with a view for substantially eliminating the disadvantages and inconveniences inherent in the prior art asset control device and has for its essential object to provide an improved asset control device effective to enable the user to ascertain when and where the discrepancy between the current balance calculated by and recorded in the device and that described in the banker's specification has arisen if it actually occurred.

Another object of the present invention is to provide an improved asset control device of the type referred to above, wherein the current balance of the deposit at the bank can be automatically displayed when a check is drawn, thereby facilitating the management of the user's checks.

Another object of the present invention is to provide an improved asset control device of the type referred to above, effective to give a warning to the user in the event that, at the time the user is to draw a check, the current balance has been found equal to or smaller than the minimum deposited fund, so that an unnecessary loss of the amount deposited at the bank account resulting from the payment of any possible commission can be minimized.

A further object of the present invention is to provide an improved asset control device of the type referred above, wherein when a series of data are inputted, the user can ascertain whether or not all of the data are correctly inputted for enabling the transaction of money to be correctly recorded.

A still further object of the present invention is to provide an improved asset control device of the type referred to above, which is capable of being operated in a plurality of operating modes one at a time and wherein the user can select one of the operating modes at his or her will without the device requiring any special key in the keyboard.

The asset control device herein disclosed has been developed in view of the fact that most banks render a service to sending regularly, for example, monthly to their customers, a specification of the transactions done between the bank and the particular customers during the previous month.

According to a preferred embodiment of the present invention, the asset control device is provided, in addition to the current balance storage means described hereinbefore, with an opening balance storage means for storing the opening balance, that is, the balance brought forward from the previous month, which has been entered through the keyboard manipulation and which is the one described in the banker's specification forwarded to the user about the end of a month, and also with a transaction storage means for registering the amount of money deposited each time it has been deposited or both the amount and the serial number of a check each time it has been drawn. In this arrangement, when a check is entered, the amount of the check stored in the transaction storage means is subtracted from the opening balance or the amount of money deposited stored in the transaction storage means is added to the opening balance, the result of the calculation being subsequently displayed.

According to the present invention, the user of the asset control device can check the transaction of his or her money with respect to the opening balance by ascertaining, at the time of the check, whether or not each description in the specification forwarded from the bank and the corresponding information displayed coincide with each other. Therefore, not only can any possible error on the part of either the bank or the user be detected, but in the event that the current balance is doubted, an accurate balance can also be ascertained at any desired time by checking, at any desired time including the end of the month, all of the transactions which have occurred with respect to the opening balance. Since the asset control device of the present invention performs the management not by utilizing the cumulative amount, but by utilizing the opening balance and the transactions of money registered in the transaction storage means, the user can perform a control of his or her bank account.

According to another preferred embodiment of the present invention, the asset control device is also provided with means for temporarily displaying the current balance automatically at the time the amount of a check is to be inputted, so that the user can be informed of the balance between the current balance and the amount of the check which will show up when the check is drawn. Therefore, before the check is actually drawn, the user can ascertain whether or not the current balance less the amount of the check will break the minimum deposited fund.

According to a further preferred embodiment of the present invention, the asset control device is also provided with a minimum deposited fund storage means for the storage of information of the minimum deposited fund and a warning means for comparing the current balance with the minimum deposited fund at the time a check is to be drawn and for effecting a warning when the minimum deposited fund is smaller than the current balance. According to this embodiment, the user can check as to whether or not the current balance is higher than the minimum deposited fund before he or she actually draws the check, and will be warned when the current balance is found to be smaller than the minimum deposited fund. Therefore, the user can control his or her checks so as to avoid the possibility that the total amount of the checks drawn may break the minimum deposited fund required by the bank.

According to a still further embodiment of the present invention, the asset control device is also provided with means operable upon the completion of the entry of a series of inputs to display all of the input data and the type of each of these input data, and a reconfirming key for urging the user to reconfirm the accuracy of the respective data displayed so that whether or not the data can be correctly stored in associated registers can readily be confirmed. Thus, with the asset control device according to the present invention, when the serial number of the check to be drawn, or drawn, the amount of the check, the opening balance and other pieces of information are entered in the device, these data can be displayed sequentially together with the respective types thereof and, therefore, the user can readily confirm whether or not they are stored in the respective registers. In the event that the data has been found to be incorrectly stored in the associated registers, the user should try once more to make them correctly stored in the respective registers.

According to a yet further embodiment of the present invention, the asset control device is also provided with means operable prior to the device set in one of the operating modes to cause a display unit to display all of these modes and means operable when one of the keys adjacent a desired one of the modes being displayed is manipulated to select such desired one of the modes. In this arrangement, since one of the modes at which the device of the present invention can operate one at a time can be selected by manipulating one of the keys located in the vicinity of the display signifying such one of the modes, the necessity of the use of any mode changer slide switch can advantageously be eliminated.

BRIEF DESCRIPTION OF THE DRAWINGS

These and other objects and features of the present invention will become clear from the following description taken in conjunction with a preferred embodiment thereof with reference to the accompanying drawings, in which:

FIG. 6 is a schematic diagram showing a memory map for a random access memory used in the asset control device;

DETAILED DESCRIPTION OF THE EMBODIMENT

Figure 1:
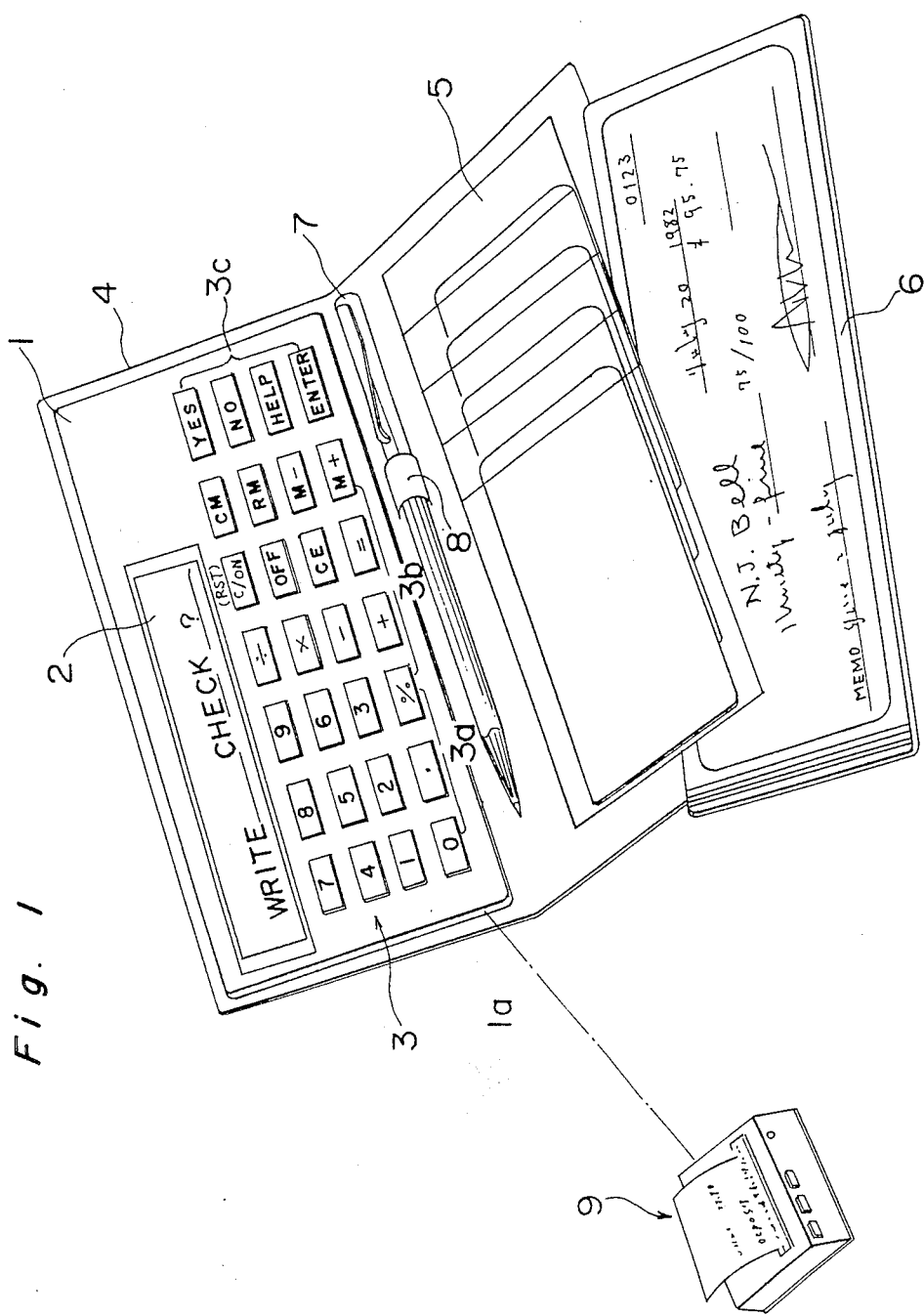
FIG. 1 is a perspective view of a personal asset control device according to the present invention.

Before the description of the present invention proceeds, it is to be noted that like parts are designated by like reference numerals throughout the accompanying drawings.

Referring first to FIG. 1, a personal asset control device according to the present invention comprises a generally rectangular plate-like body 1 having a dot-matrix liquid crystal display unit 2 and an input keyboard 3. The body 1 has at its one end a connecting terminal 1a for the electric connection with an external printer 9 which is one of the accessories optionally available to the device. This body 1 is accommodated in a holdable plate-like casing 4 which is provided with a card holder 5 for the accommodation or securement of a batch of personal checks 6 and a pen holder 8 for the support of a writing instrument, for example, a ballpoint pen 7.

The input keyboard 3 includes numerical input keys 3a, function keys 3b signifying the four rules of arithmetic and the reading and writing of information in a memory and function keys 3c for entering information of transactions. The function keys 3c include "YES" and "NO" keys adapted to be depressed when the information displayed has been confirmed correct and wrong, respectively, a "HELP" key adapted to be depressed when the user of the device is at a loss as to how to use the device, and an "ENTER" key adapted to be depressed when the information of transactions are to be entered.

Figure 2:
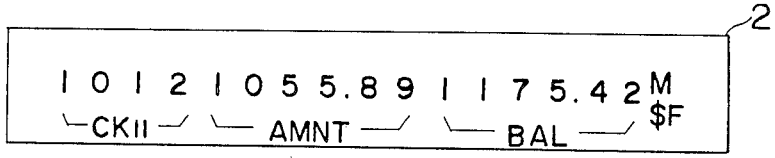
FIG. 2 is a plan view showing an example of display effected in a display unit of the asset control device.

Referring now to FIG. 2 showing one example of information displayed on the display unit 2, the first four digits shown as reading "1012" represents the serial number of a check; the next six digits shown as reading "1055.89" represent the amount of the check (in terms of dollar); and the last six digits shown as reading "1175.52" represent the amount of current balance.

Figure 3:
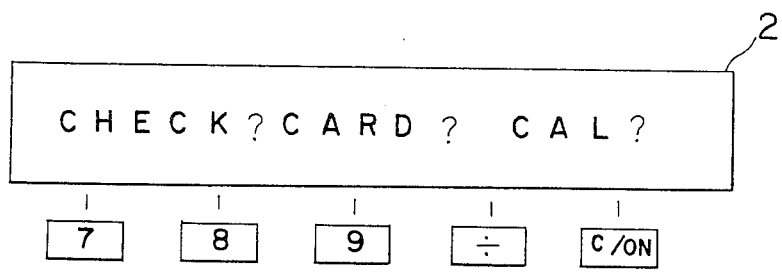
FIG. 3 is a view similar to FIG. 2, showing mode designations being displayed in the display unit which are shown together with some of the keys in the keyboard.
Figure 4:
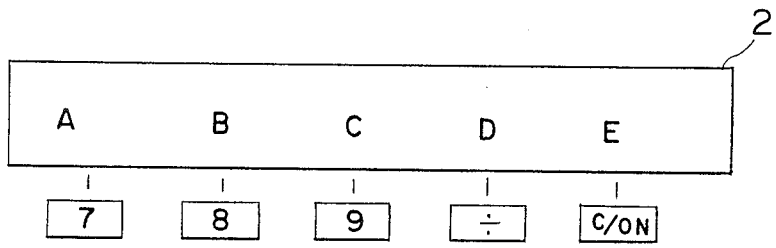
FIG. 4 is a view similar to FIG. 2, showing the symbols representative of five respective types of credit cards, which are shown together with some of the keys in the keyboard.

FIG. 3 illustrates the display effected when one of the operating modes of the device is to be selected. This display is effected simultaneously with the activation of the device with electric power for the purpose of making inquiries to the user if he or she wishes to use the device in a check mode, a credit card mode or a calculator mode. It is to be noted that the "7", "8", "9", "÷" and "C/ON" keys are arranged immediately below the display unit 2 so that, by depressing one of the "7", "9" and "C/ON" keys, one of the mode designations displayed which is generally aligned with such one of the keys can be selected. Specifically, when the "7" key is depressed, the device operates under the check mode; when the "9" key is depressed, the device operates under the credit card mode; and when the "C/ON" key is depressed, the device operates under the calculator mode. FIG. 4 illustrates the display effected when one of the five credit cards designated A, B, C, D and E cards, respectively, is to be selected. As shown, the "7", "8", "9", "÷" and "C/ON" keys are located immediately below, and aligned with, the displayed symbols "A", "B", "C", "D" and "E" signifying the A, B, C, D and E credit cards. Accordingly, when the "7", "8", "9", "÷" and "C/ON" keys are depressed one at a time, the A, B, C, D and E cards are selected, respectively.

Figure 5:
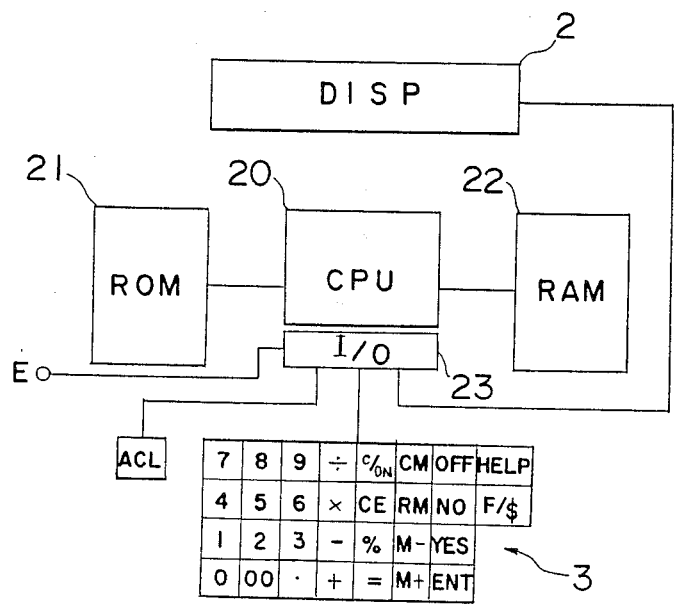
FIG. 5 is a schematic block circuit diagram showing the asset control device.

Referring now to FIG. 5, the personal asset control device according to the present invention includes a central processing unit (CPU) 20 connected through respective bus lines with a read-only memory (ROM) 21 for the storage of programs and a random access memory 22 used to store information of transactions and the like and allocated with work areas and flags. Keyboard instructions outputted from the keyboard 3 are supplied to the CPU 20 through an input and output interface 23. Data to be displayed by the display unit 2 are supplied to the display unit 2 through the interface 23. Also connected with the interface 23 is an external terminal E and an auto-clear key ACL.

FIG. 6 illustrates a memory map of an essential part of the RAM 22.

An area MA constitutes a transaction storage means and is comprised of a group of 30 registers N0 to N29 each for the storage of the serial number of a check and also another group of 30 registers M0 to M29 each for the storage of the amount of such check.

An area MB is comprised of five memories associated respectively with the A to E cards for the storage of the cumulative amount of money paid by the use of the respective credit card.

An area MC is comprised of four registers O, P, Q and R. The register O is used to store the opening balance; the register P is used to store the current balance; the register Q is used to store the minimum deposited fund or minimum balance; and the register R is used to store the serial number of the last check drawn.

An area MD is comprised of four operational registers X, Y, Z and W and a memory M for the storage of calculated data.

An area ME is comprised of counters n, d and b. The counter n is used to specify the address of the 30 registers in the area MA, and the counters d and b are used when a RECONCILE mode (a transaction check routine), as will be described later, is to be executed.

The operation of the asset control device of the construction described above will now be described with reference to the various flow charts shown in FIG. 7 through FIG. 17.

Figure 7:
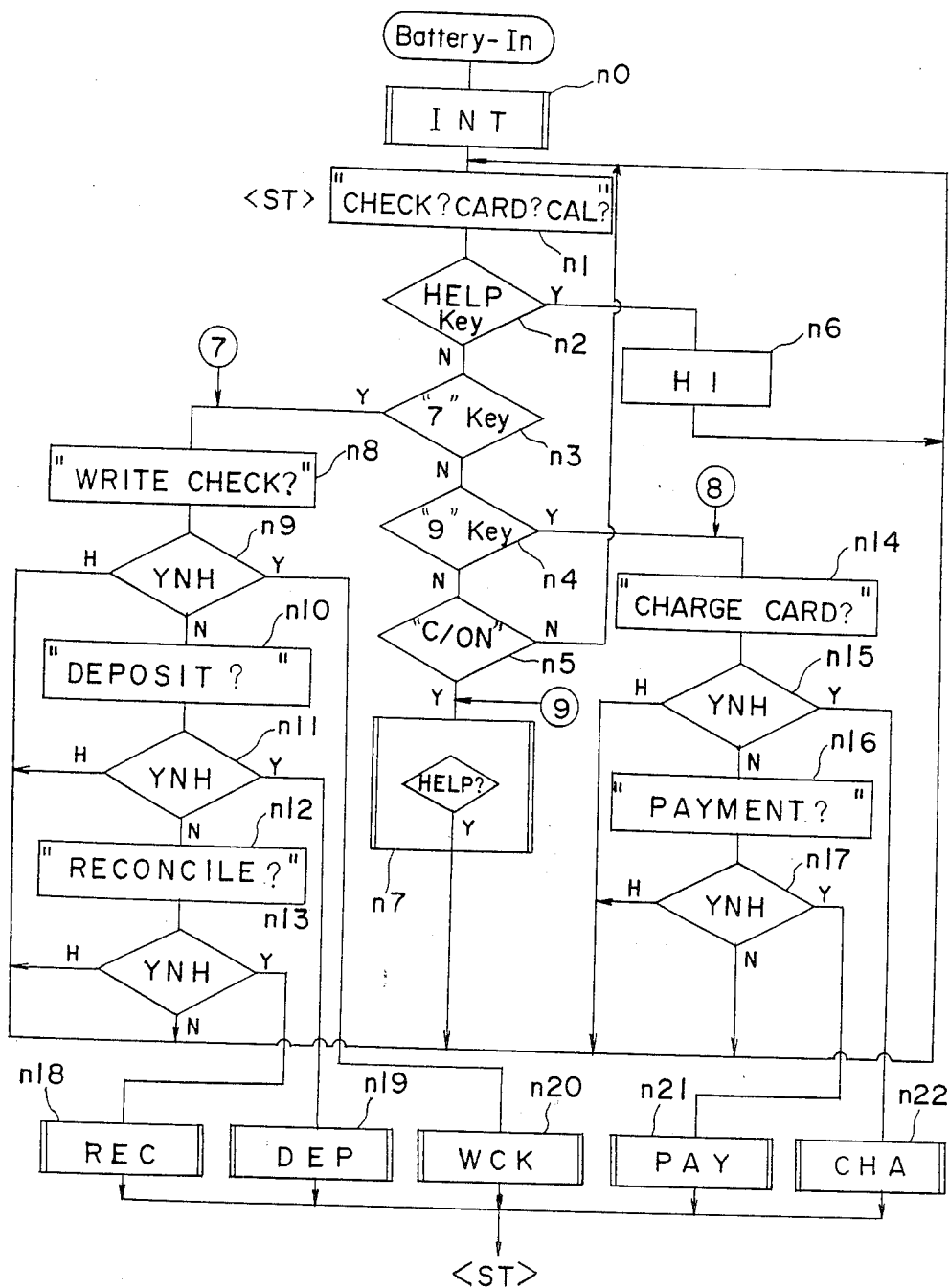
FIG. 7 is a flow chart showing a main control program of sequential operation of the device.
Figure 8:
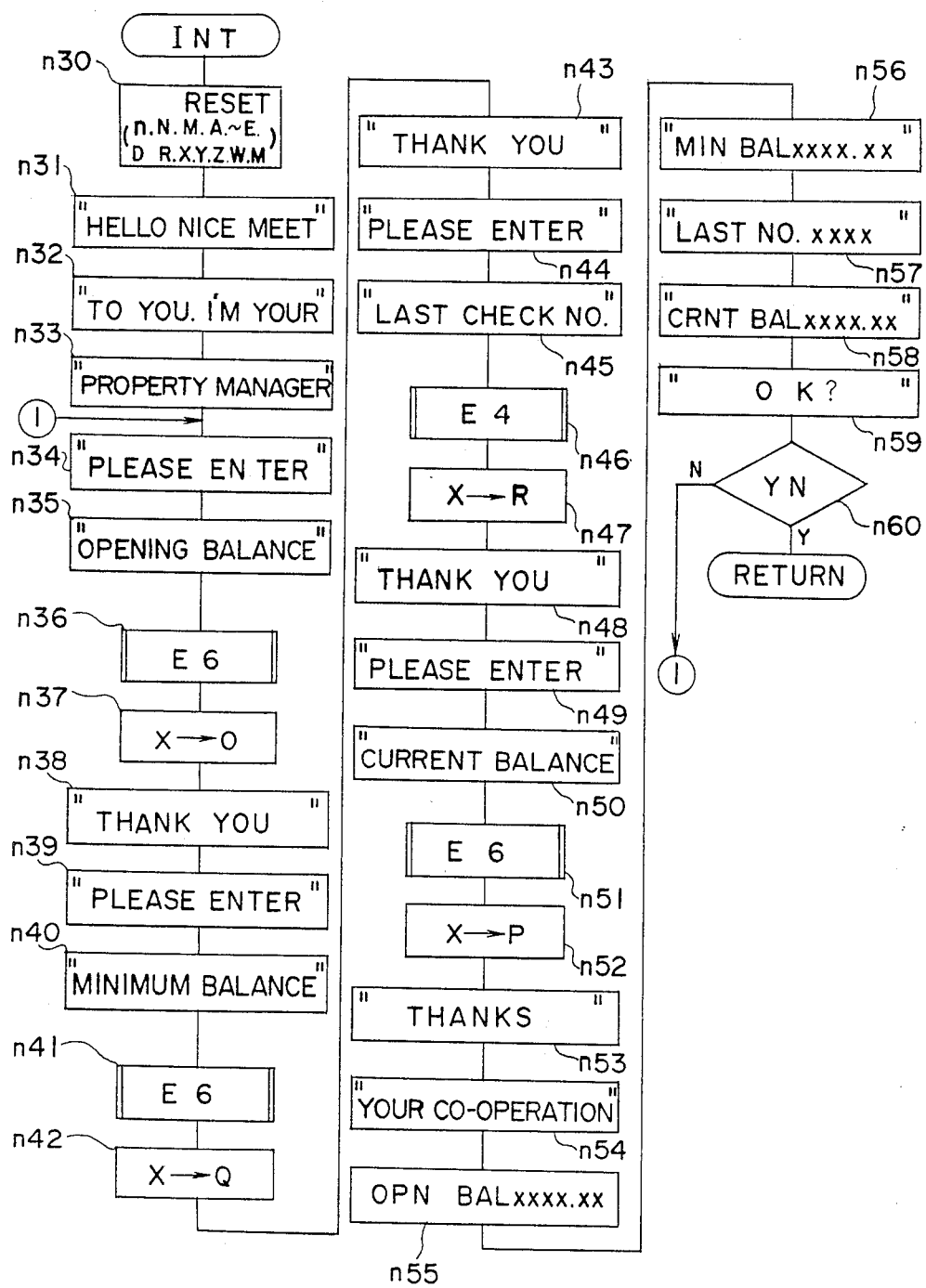
FIG. 8 is a flow chart showing an initialization subroutine.

Referring to FIG. 7 which illustrates a main routine, when a battery is inserted, an initialization subroutine shown in FIG. 8 is executed at a step n0. During the execution of the initialization subroutine, the opening balance, the current balance, the minimum balance and the serial number of the last check drawn are all stored in the area MC of the RAM 22.

Figure 9:
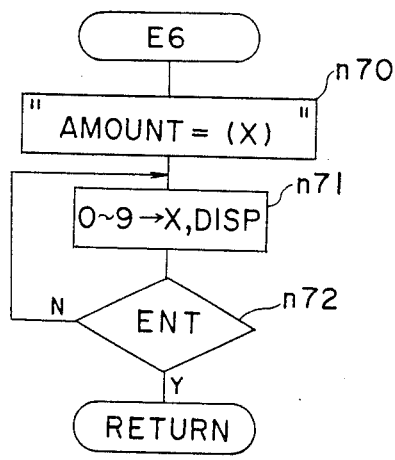
FIG. 9 is a flow chart showing a subroutine E6.

Referring to FIG. 8, at the step n30, the memory resetting takes place. The areas to be reset are all of the areas shown in FIG. 6. Then, at the next successive steps n31 to n33, a greeting "Hello nice meet to you. I'm your property manager." is displayed in the display unit 2 in three fractions "HELLO NICE MEET", "TO YOU. I'M YOUR" and "PROPERTY MANAGER" which appear one after another at intervals of 0.5 to a few seconds. Subsequent to the display of the greeting and at the successive steps n34 and n35, an instruction to the user reading "Please enter the opening balance." is displayed in two fractions "PLEASE ENTER" and "OPENING BALANCE" to invite the user to enter the opening balance in terms of the balance of the deposit at the bank as of the end of the previous month. A subroutine E6 to be executed at the step n36 is for causing the amount of money entered through the input keyboard to be stored in the register X and is shown in FIG. 9. As shown in FIG. 9, at the step n70, a legend "AMOUNT=(X)" is displayed to invite the user to enter the amount of money by manipulating source of the numerical input keys. The data of the amount of money so entered at the step n70 is stored in the register X and, at the same time, displayed by the display unit 2 at the step n71. Specifically, the data of the amount of money entered before the "ENTER" key is depressed is stored in the register X, but when the "ENTER" key is depressed, the program flow returns to the step n37 shown in FIG. 8.

It is to be noted that, since the entry of the opening balance is waited for at the step n35 in the program flow of FIG. 8, the opening balance is stored in the register X at the time the subroutine E6 has been executed at the step n36. At the step n37, the contents of the register X are transferred to the register O for the registration of the opening balance. At the subsequent successive steps n38 to n40, a message reading "Thank you. Please enter the minimum balance" is displayed in three successive fractions "THANK YOU", "PLEASE ENTER" and "MINIMUM BALANCE" to invite the user to enter the minimum deposited fund or minimum balance. The minimum balance is then stored in the register X through the execution of the subroutine E6 at the step n41. After the execution of the subroutine E6 and at the step n42, the minimum balance stored in the register X is transferred to the register Q. Then, at the successive steps n43, n44 and n45, a message is displayed in three successive fractions "THANK YOU", "PLEASE ENTER" and "LAST CHECK NO." to invite the user to enter the serial number of the last check drawn. At the subsequent step n46, the last check number is stored in the register X and is at the step n47 transferred to the register R. After the completion of the transfer, and at the three successive steps n48 to n50, a message is displayed in three successive fractions "THANK YOU", "PLEASE ENTER" and "CURRENT BALANCE" to invite the user to enter the current balance. When and after the contents thereof have been entered at the step n51, the current balance so entered is transferred to the register P at the step n52. When the opening balance, the minimum balance, the last check number and the current balance have been stored in the registers O, Q, R and P, respectively, a message reading "Thanks. Your cooperation" is displayed at the two successive steps n53 and n54 in two fractions "THANKS" and "YOUR CO-OPERATION". Thereafter, at the successive steps n55 to n59, the opening balance, the minimum balance, the last check number, the current balance, and a question reading "OK?" signifying whether or not each of the contents stored respectively in the registers O, Q, R and P is correct and are successively displayed. If all of these data are found to have been correctly stored, the user has to depress the "YES" key at the step n60 thereby causing the program flow to return to the main routine. On the other hand, if one or some of the data are found to have been incorrectly stored, he or she has to depress the "NO" key at the step n60 causing the program flow to proceed to the step n34 so that the user can re-enter the required information.

Referring back to FIG. 7 showing the main routine, after the execution of the initialization routine at the step n0. "CHECK? CARD? CAL?" display is effected. The condition in which the display unit 2 displays the legends "CHECK? CARD? CAL?" is hereinafter referred to as an ST condition. This ST condition signifies that the user should select one of the operating modes of the asset control device. The selection of one of the operating modes can be done by depressing one of the "7", "9" and "C/ON" keys. The steps n3 to n5 are decision steps at which inquiries are made one after another to find one of the "7", "9" and "C/ON" keys which has been depressed in selecting the operating mode. It is to be noted that, when the "HELP" key is depressed during the ST condition, at the step n2, the process proceeds to the step n6 at which a subroutine HI shown in FIG. 10 is executed.

Figure 10:
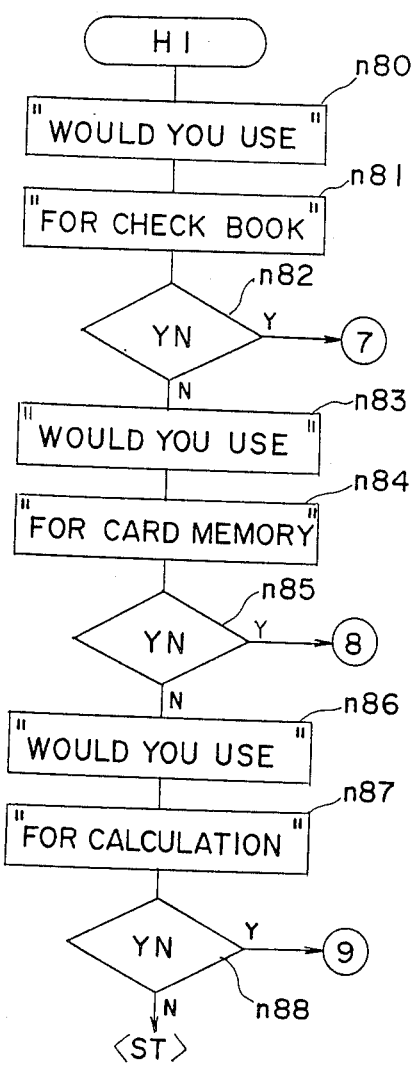
FIG. 10 is a flow chart showing a subroutine HI.

Referring to FIG. 10 showing the subroutine HI to be executed at the step n6 of the main routine, a first inquiry is made with the display unit 2 displaying "WOULD YOU USE FOR CHECK BOOK" in two fractions at the two successive steps n80 and n81. This is a question asking the user if he or she intends to use the asset control device in the check mode. If the "YES" key is depressed at the subsequent step n82, the program flow proceeds to the step n8 of the main routine. On the other hand, if the "NO" key is depressed at the step n82, then the next inquiry is made with the display unit 2 displaying "WOULD YOU USE FOR CARD MEMORY" in two fractions at the successive steps n83 and n84 as shown. This is a question asking the user if he or she intends to use the device in the credit card mode. If the "YES" key is depressed at the step n85, the program flow proceeds to the step n14 of the main routine, but if the "NO" key is depressed, the final inquiry is made with the display unit 2 displaying "WOULD YOU USE FOR CALCULATION" in two fractions at the successive steps n86 and n87 as shown, asking the user if he or she intends to use the device as a calculator. If the "YES" key is depressed at the step n88, the program flow proceeds to the step n7 of the main routine, but if the "NO" key is depressed, the program flow will return to the step n1 of the main routine.

The subroutine HI is provided for facilitating the selection of one of the operating modes by allowing the device to communicate with the user. Accordingly, should the user be unfamiliar in handling the device, he or she has to make use of the "HELP" key to conduct the communication with the device in determining one of the operating modes.

Referring to the main routine shown in FIG. 7, if the "7" key is depressed at the step n3 during the ST condition, the check mode is selected and the program flow proceeds to the step n8. At the step n8, "WRITE CHECK?" is displayed asking the user if he or she intends to draw a check. If the user intends to do so, the program flow proceeds to the step n20 at which a subroutine WCK is executed. If the user does not intend to do so, the program flow proceeds to the step n10 at which "DEPOSIT?" is displayed asking the user if he or she intends to deposit money. When the "YES" key is depressed at the step n11, the program flow proceeds to the step n19 at which a subroutine DEP is executed, but when the "NO" key is depressed, the program flow proceeds to the step n12 at which "RECONCILE?" is displayed asking the user if he or she wishes to make a check of the transactions of money. If the "YES" key is depressed at the step n13, a subroutine REC is executed at the step n18, but if the "NO" key is depressed, the program flow returns to the step n1. It is to be noted that when the "HELP" key is depressed at any one of the steps n9, n11 and n13, the program flow returns to the step n1.

Should the "9" key be depressed at the step n4 during the ST condition, the program flow proceeds to the step n14. As hereinbefore described, the depression of the "9" key means the selection of the credit card mode. At the step n14, "CHARGE CARD?" is displayed asking the user if he or she intends to make a purchase with a credit card. If the "YES" Key is depressed at the step n15, the program flow proceeds to the step n22 at which a subroutine CHA is executed. On the other hand, if the "NO" key is depressed at the step n15, then, "PAYMENT?" is displayed at the step n16 asking the user if he or she intends to effect payment against the credit card bill. If the "YES" key is depressed at the step n17, a subroutine PAY is executed at the step n21, but if the "NO" key is depressed, the program flow returns to the step n1. It is to be noted that when the "HELP" key is depressed at any one of the steps n15 and n17, the program flow returns to the step n1.

Should the "C/ON" key be depressed at the step n5, the calculator mode is selected and a subroutine for the calculation is executed at the step n7. The subroutine for the calculation is well known to those skilled in the art. However, if the "HELP" key is depressed during the execution of the calculator subroutine, the calculator subroutine is interrupted and the program flow proceeds to the step n1.

In the manner as hereinabove described, one of the check, credit card and calculator modes can be selected and the subroutine corresponding to the selected mode can be executed. Each of the subroutines REC, DEP, WCK, PAY and CHA will now be described.

Figures 11A, 11B:
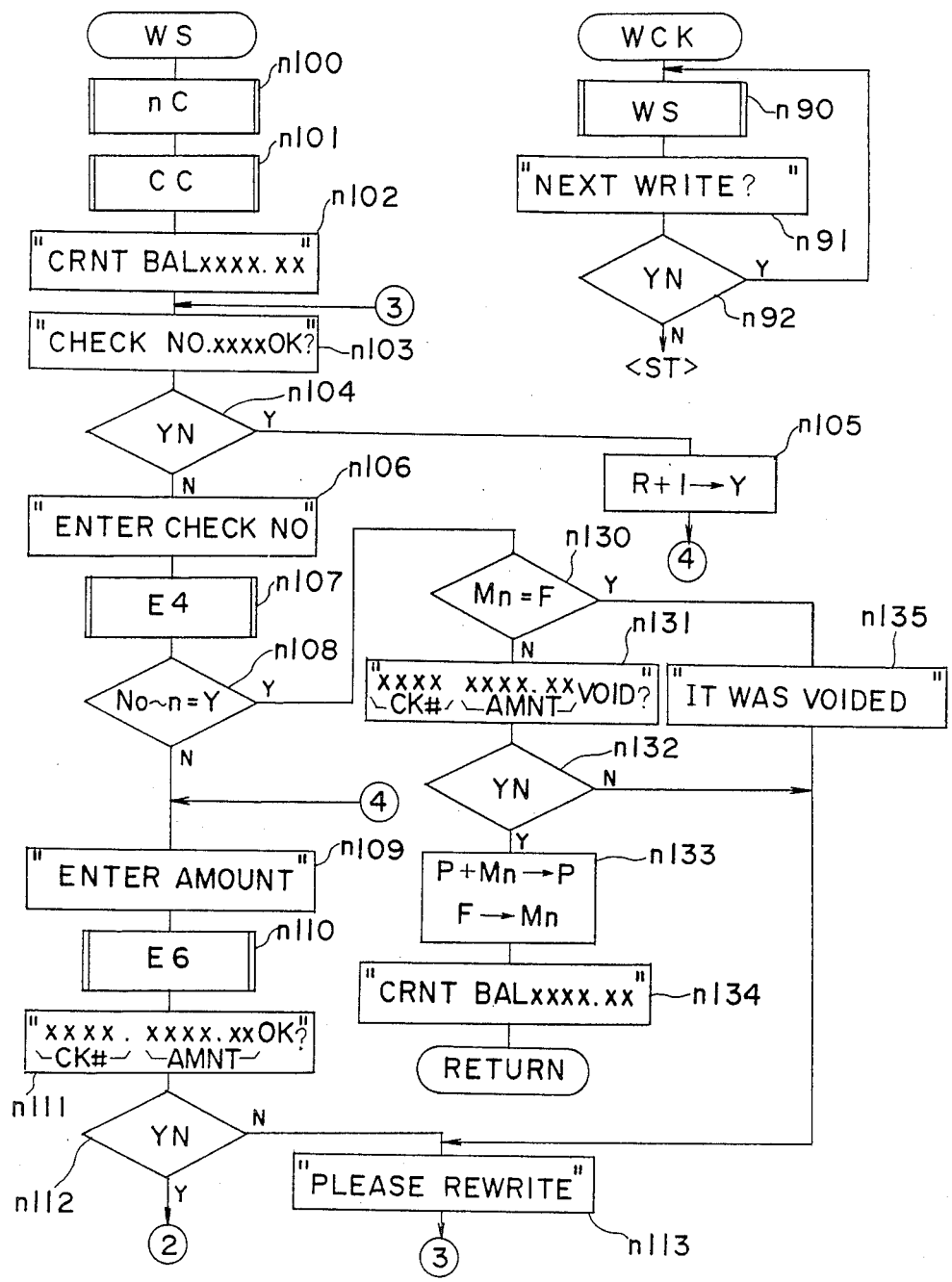
FIG. 11(A) is a flow chart showing a subroutine WCK.
FIGS. 11(B) and 11(C) are flow charts showing a "write check" processing subroutine.
Figure 11C:
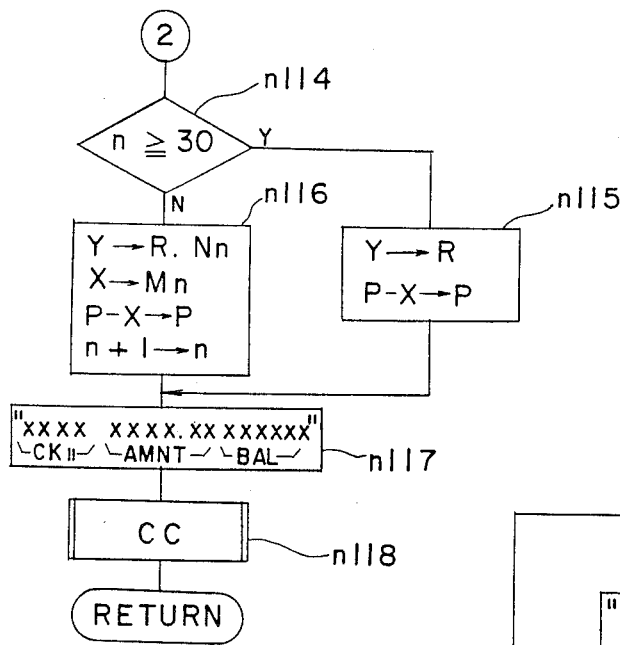

Referring first to FIG. 11(A) showing the subroutine WCK to be executed at the step n20 of the main routine, at the step n90, a write-check processing subroutine WS shown in FIG. 11(B) for the drawing of a check under the check mode is executed. Subsequent to the execution of the subroutine at the step n90, "NEXT WRITE?" is displayed at the step n91 asking the user if he or she intends to draw the next succeeding check. If the "YES" key is depressed at the step n92, the program flow proceeds to the step n90, but if the "NO" key is depressed, the ST condition is resumed.

Referring to the subroutine WS shown in FIG. 11(B), and at the step n100, the lowermost subroutine nC is executed. During the execution of this subroutine nC, a decision is made as to whether or not all of the area MA of the RAM 22, that is, all of the N and M registers for the respective storage of the check numbers and the amounts of these checks, are totally used. After this decision, another subroutine CC is executed at the step n101. During the execution of the subroutine CC, a decision is made as to whether or not the current balance has broken the minimum balance. The details of each of the subroutines nC and CC will be described later.

Subsequent to the decision done at the step n101, the content of the register P representative of the current balance is displayed at the step n102. At the step n103, the checks are assumed to be drawn successively one after another and the last check number stored in the register R and incremented by one is displayed. If the user has confirmed the check number so displayed and when he or she depresses the "YES" key at the step n104, the program flow proceeds to the step n105 at which the check number stored in the register R and incremented by one is stored in the register Y for the calculator which uses it as a work area. On the other hand, if the "NO" key is depressed at the step n104, "ENTER CHECK NO." is displayed to invite the user to enter the correct check number. Subsequent to the step n106, the subroutine E4 is executed at the step n107.

Figure 12:
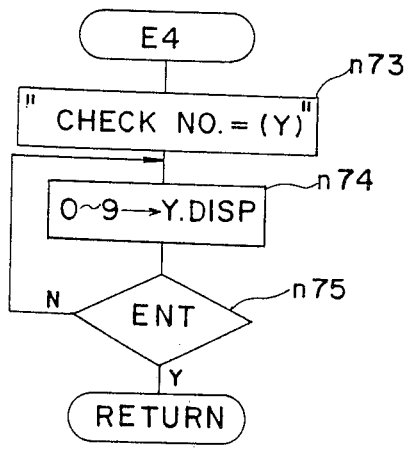
FIG. 12 is a flow chart showing a subroutine E4.

Referring to the subroutine E4 shown in FIG. 12, at the step n73, "CHECK NO.=(Y)" is displayed to invite the user to enter the check number. Then, as is the case with the subroutine shown in and described with reference to Fig. 9, the data entered are stored in the register Y at the step n74. When the "ENTER" key is subsequently depressed at the step n75, the program flow returns to the initial program flow.

After the execution of the subroutine E4 at the step n107, the correct check number has been stored in the register Y. However, at the step n108, a decision is made as to whether the check number stored in the register Y has been registered in the area MA of the RAM 22. If it has not been registered, the step n109 is carried out to drsplay "ENTER AMOUNT" inviting the user to enter the amount of the check. Thereafter, the subroutine E6 is executed at the step n110 to store the amount of the check in the register X. Both the check number stored in the register X and the amount of the check stored in the register Y are then displayed at the step n111 for the purpose of reconfirmation to be done by the user. If the "YES" key is depressed at the subsequent step n112, the program flow proceeds to the step n114 shown in FIG. 11(C) at which a decision is made as to whether or not the area MA of the RAM 22 has become full. If the area MA is found full, the step n115 is carried out to transfer the content of the register Y to the register R as the last check number. At the same time, the amount stored in the register X is subtracted from the current balance stored in the register P, the balance being then stored in the register P. On the other hand, if the area MA is found not full, a process similar to that at the step n115 is performed and, at the same time, the content of the register Y and the content of the register X are registered in the register Nn in the area MA and the register Mn in the area MA, respec-
tively. In addition, the count of the counter n is incremented by one. At the subsequent step n117, all of the check number, the amount of the check and the current balance are displayed. Then, the program flow proceeds to the step n118 at which, as is the case with the step n101, the current balance and the minimum balance are compared with each other.

On the other hand, in the event that the "NO" key is depressed at the step n112, "PLEASE REWRITE" is displayed at the step n113 and, thereafter, the program flow proceeds back to the step n103.

Figure 11D:
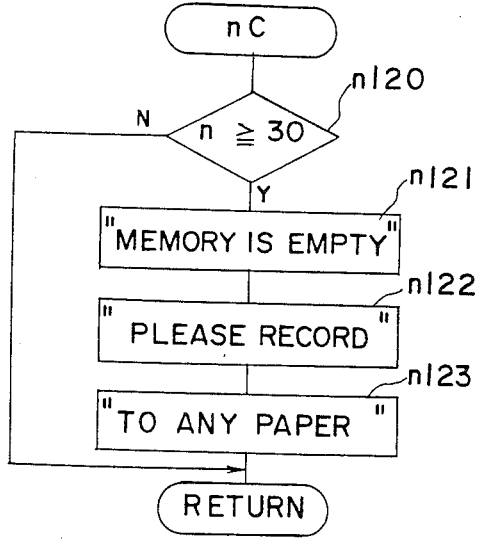

Referring to FIG. 11(D) showing the subroutine nC to be executed at the step n100, the counter n serves to specify the addresses of the registers N and M. Since the number of each of the registers N and M is 30, all of the registers are deemed full and are not ready to register information when the count of the counter n shows 30. Accordingly, if the count of the counter n is found to be exceeding 30 at the step n120, "Memory is empty. Please record to any paper." is displayed at the successive steps n121 to n 123 in three fractions "MEMORY IS EMPTY", "PLEASE RECORD" and "TO ANY PAPER" to inform the user that the intended registration cannot be performed. However, if the count is found to be smaller than 30, the program flow returns to the flow shown in FIG. 11(B).

Figure 11E:
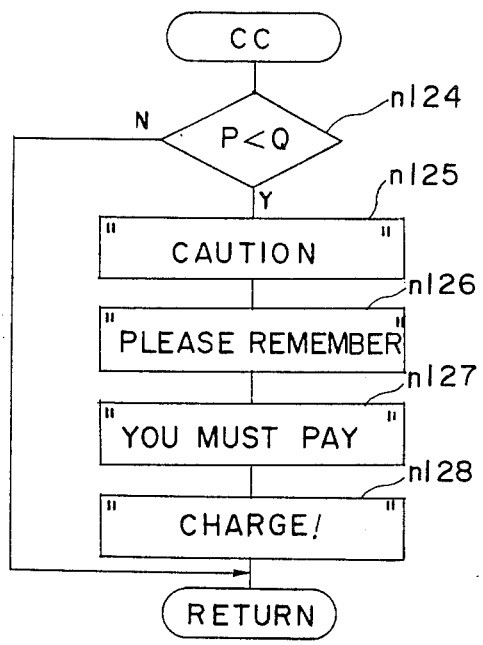

The subroutine CC to be executed at the step n101 and shown in FIG. 11(E) is provided for calling the user's attention to the fact that the result of comparison of the minimum balance stored in the register Q and the current balance stored in the register P shows that the current balance has broken the minimum balance. Referring to FIG. 11(E) and at the step n124, the contents of the registers P and Q are compared with each other. If the current balance is greater than the minimum balance, the program flow shown in FIG. 11(B) is resumed. However, if the current balance is smaller than the minimum balance, a warning is effected at the four successive steps n125 to n128 in four fractions "CAUTION", "PLEASE REMEMBER", "YOU MUST PAY" and "CHARGE!" to inform the user of the possibility that, because of the current balance getting smaller than the minimum balance, he or she would be required to pay a requisite commission to the banker. Thus, where the user desires to avoid the payment of the commission, he or she should deposit money at the bank or cancel the check then drawn at the time the warning is so effected.

The cancellation of the check can be entered by the use of the subroutine WS. Specifically, the number of the check desired to be cancelled is entered at the step n107. Then, the program flow skips from the step n108 to the step n130. Since the content of the selected register M is not a code F, the step n131 is executed to display the check number desired to be cancelled and the amount of the check desired to be cancelled together with "VOID?" asking the user if he or she wishes to void the check and its amount displayed at the step n131. If the "YES" key is depressed at the step n132, a cancellation code F is stored in the register Mn and the amount stored in the register Mn is added to the current balance at the step n133 and, then, the current balance added with the amount of the check cancelled is displayed at the step n134, the program flow being thereafter returning to the main routine. In this way, the check once drawn can be cancelled and the information associated therewith is also cancelled from the memory in the device. However, since the check once cancelled may be registered as if having not been cancelled when the above described procedures are performed, the step n130 skips to the step n135 when the number of the cancelled check is entered. At the step n135, "IT WAS VOIDED" is displayed to inform the user that the check specified by such number had been cancelled and, then, at the step n113, "PLEASE REWRITE" is displayed to invite the user to re-enter the number of the check not cancelled.

As hereinbefore described, when a check is drawn and when the check once drawn is to be cancelled, the registration thereof takes place in the area MA. In addition, each time a check is drawn, a decision is carried out to determine whether or not the area MA is full, and if it is found to be full, the display takes place to that effect. Moreover, a decision is also carried out to determine whether or not the current balance has broken the minimum balance, and if it is found to have broken the minimum balance, the display to that effect takes place to call the user's attention thereto.

Figure 13:
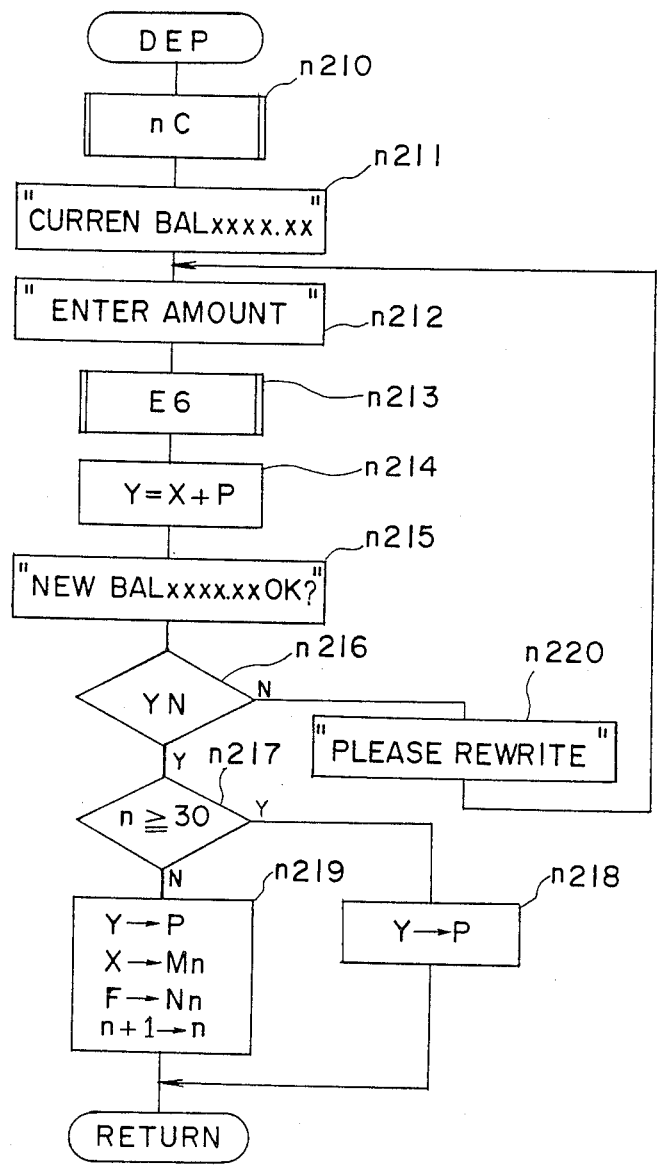
FIG. 13 is a flow chart showing a subroutine DEP.

Referring now to FIG. 13, the subroutine DEP is executed at the step n19 when the "YES" key has been depressed at the step n11. At the outset and at the step n210, the lowermost subroutine nC shown in and described with reference to FIG. 11(D) is executed to determine the status of the area MA and to effect the display, if all of the 30 registers have been utilized, to call the user's attention. After the execution of the subroutine nC, the current balance is displayed at the step n211. Then, at the step n212, "ENTER AMOUNT" is displayed, and the amount of money deposited which has been entered is stored in the register X. The data so stored is added to the current balance stored in the register P, the sum being then stored in the register Y (see the step n213). Thereafter, the new balance, that is, the sum of the deposited amount and the current balance, is displayed at the step n215 together with "OK?" asking the user's reconfirmation. If the "YES" key is depressed at the step n216, a decision is made at the step n217 as to whether or not the number of the registers used has exceeded 30 and, if it has exceeded, the program flow returns to the main routine after the content of the register Y has been transferred to and stored in the register P at the step n218. On the other hand, if the result of the decision at the step n217 is that it has not exceeded 30, the step n219 is performed to transfer the content of the register Y to the register P, to register the content of the register X in the register Mn and to register a deposit code F in the register Nn and also to increment the count of the counter n by one. However, if the "NO" key is depressed at the step n216, "PLEASE REWRITE" is displayed at the step n220 to invite the user to re-enter the amount of money deposited. In this way, the device operates under the check mode to perform the procedures resulting from the deposit of money.

Figure 14:
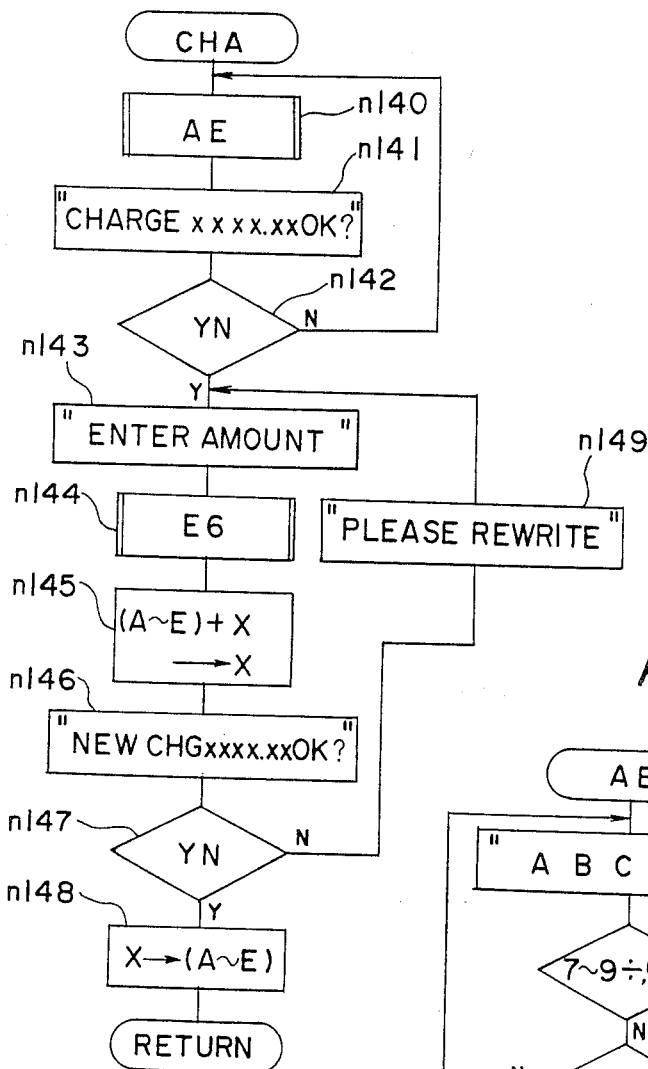
FIG. 14 is a flow chart showing a subroutine CHA.

The subroutine CHA performed at the step n22 of the main routine of FIG. 7 is executed when a purchase is done with a credit card. Referring particularly to FIG. 14, at the step n140, the lowermost subroutine AE is executed. During the execution of the subroutine AE, one of the five credit cards, i.e., one of the A, B, C, D and E cards, is selected. Referring to the subroutine AE shown in FIG. 5, at the step n150, the display as shown in FIG. 4 is effected. As hereinbefore described, the selection of one of the credit cards can be carried out by depressing one of the "7", "8", "9", "÷" and "C/ON" keys. Thus, when one of these keys is depressed at the step n151, the credit card specified by one of the displayed characters "A", "B", "C", "D" and "E" which is immediately above and aligned with one of the keys actually depressed is selected at the step n152. Should the "HELP" key be depressed at the step n153 without any of the keys depressed at the step n151, a message reading "I have five memories. Please assign each card to A to E." is displayed at the successive steps n154 to n156 in three fractions "I HAVE 5 MEMORIES", "PLEASE ASSIGN" and "EACH CARD TO A-E" as shown to invite the user to depress one of the "7", "8", "9", "÷" and "C/ON" keys.

Referring to FIG. 14, subsequent to the execution of the subroutine AE at the step n140, the amount charged against the use of the selected card is displayed at the step n141 together with "OK?" asking for the user's reconfirmation. If the "YES" key is depressed at the step n142, the user is invited to enter the purchase cost and, at the step n144, the purchase cost stored in the register X is added to the charge, the resultant sum being then stored in the register X at the step n145. Subsequently, a new charge is displayed at the step n146 together with "OK?" asking for the user's reconfirmation. Should the "YES" key be depressed at the step n147, the new charge is stored as the cumulative amount for the card used and the program flow returns to the main route. On the other hand, if the "NO" key is depressed at the step n147, "PLEASE REWRITE" is displayed at the step n149, followed by the step n143. In this way, the subroutine CHA is executed.

Where the subroutine PAY is selected during the execution of the main routine, it is executed in the manner which will now be described with reference to FIG. 16.

Figure 15:
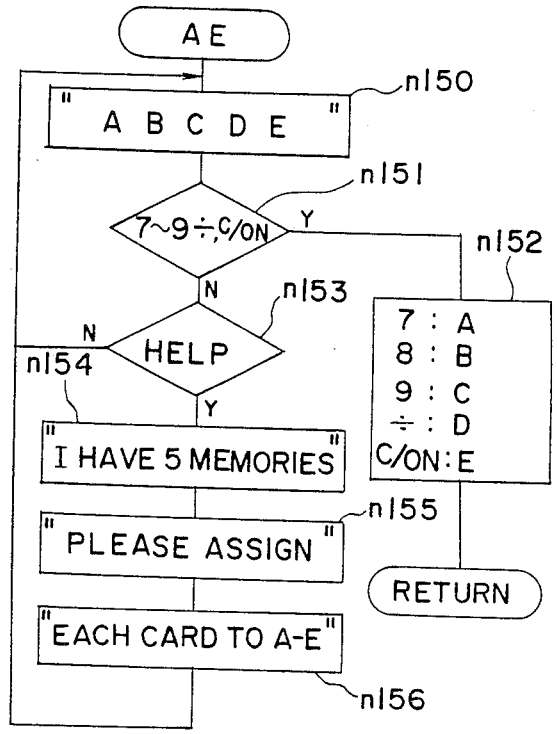
FIG. 15 is a flow chart showing a subroutine AE.
Figure 16:
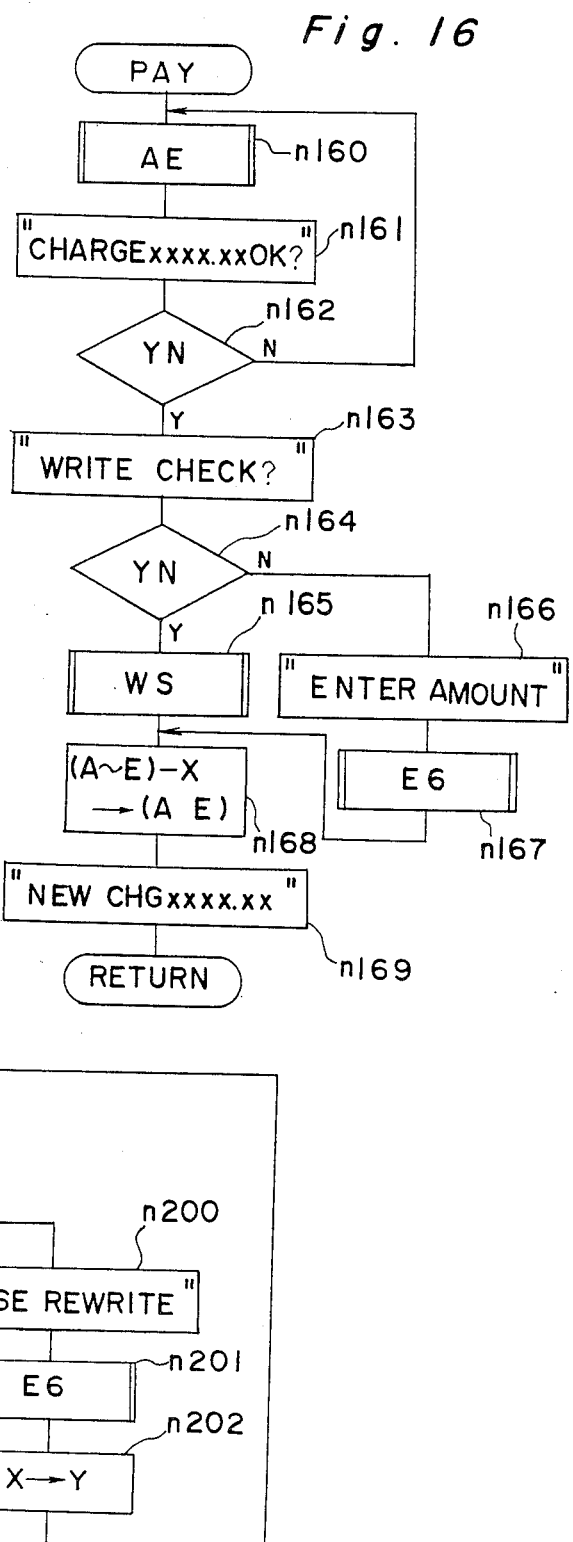
FIG. 16 is a flow chart showing a subroutine PAY associated with the payment using a card.

Referring now to FIG. 16, at the step n160, the subroutine AE is executed in the manner as hereinbefore described with reference to FIG. 15 and, as a result thereof, one of the cards is arbitrarily selected. The cumulative amount thereof is then displayed at the step n161 together with "OK?" asking for the user's reconfirmation. If the "YES" key is depressed at the step n162, "WRITE CHECK?" is displayed at the step n163, asking the user if he or she is going to settle the payment with a check. If the "YES" key is then depressed at the step n164, the subroutine WS is executed at the step n165 in the manner as hereinbefore described. Contrary thereto, if the user intends to settle the payment with cash, the step n166 is performed at which time "ENTER AMOUNT" is displayed to invite the user to enter the amount to be paid with cash. Thereafter, the subroutine E6 is executed at the step n167 with the amount due consequently stored in the register X. Since the register X stores the amount due at the time either the step n165 or the step 167 is executed, the amount due is subtracted from the cumulative amount for the selected card with the balance being again stored. Then, a new charge is displayed at the step n169, followed by the return to the main routine.

The operation of the device which takes place when the subroutine REC is selected under the check mode during the execution of the main routine of FIG. 7 will now be described with particular reference to FIGS. 17(A) and 17(B). It is to be noted that during the execution of the subroutine REC, a check is carried out between the data registered in the area MA and the balance stored in the registers O and P in the area MC to determine the transaction of money.

Figure 17B:
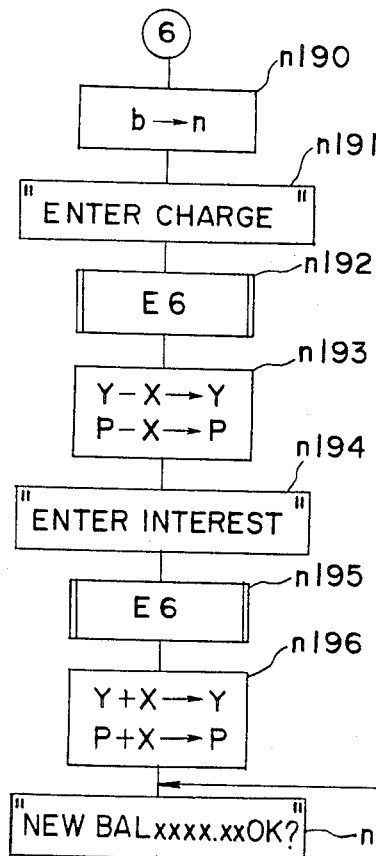
FIGS. 17(A) and 17(B) are flow charts showing a subroutine REC.
Figure 17A:
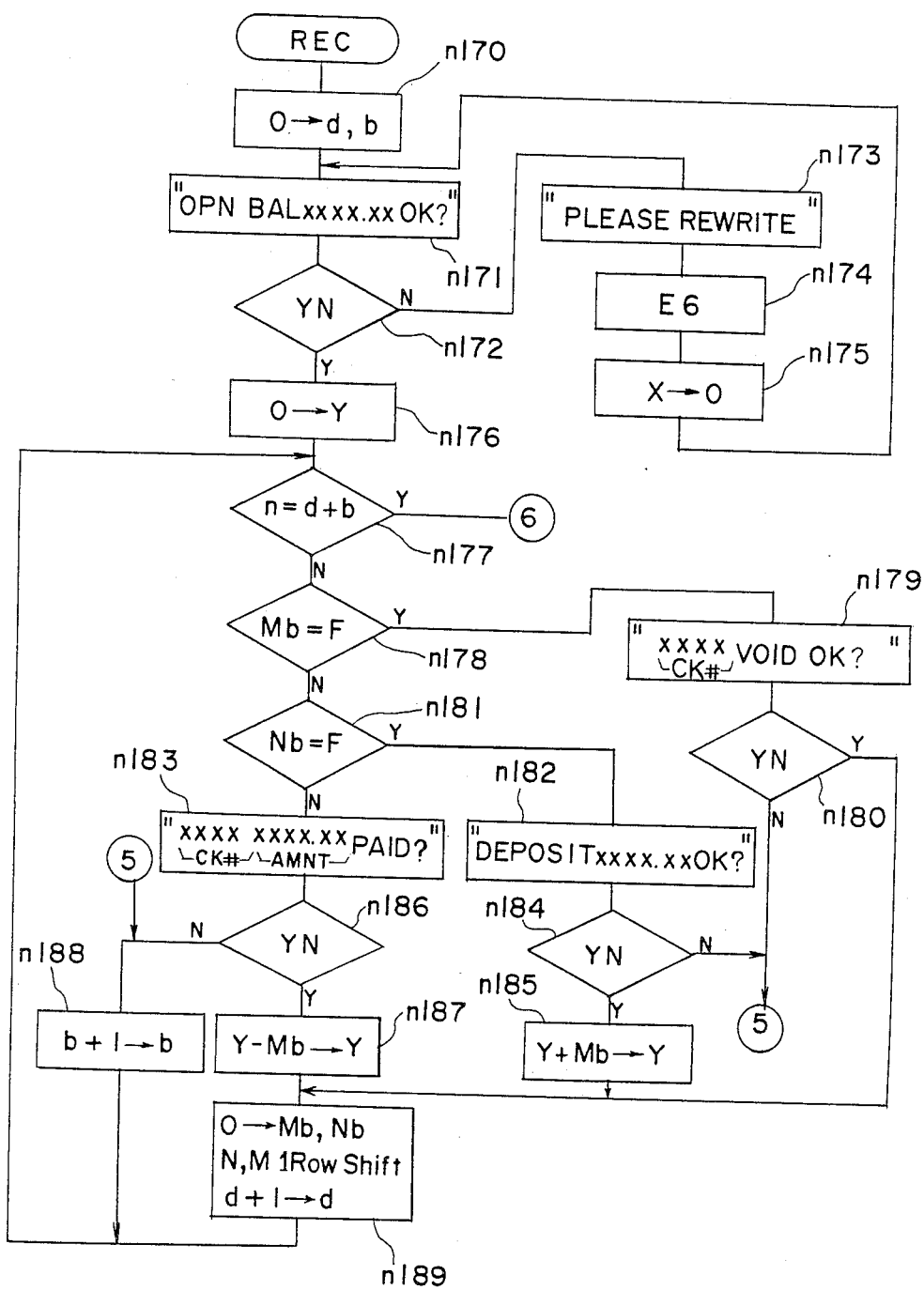

Referring now to FIG. 17(A), at the initial step n170, the counters d and b are reset. Then, at the step n171, the opening balance is displayed together with "OK?" asking for the user's reconfirmation. At this time, the user should refer to the opening balance described in the specification or statement forwarded from his or her banker to confirm that the opening balance displayed coincides with that described in the banker's specification. If the "NO" key is depressed at the step n172 when the opening balance displayed is found not coinciding with that in the banker's specification, the program flow proceeds to the step n173 with "PLEASE REWRITE" consequently displayed. After a new opening balance has been entered at the step n174, the content thereof is stored in the register O at the step n175. In the event that the "YES" key is depressed at the step n172, the content of the register O is temporarily transferred also to the register Y. The decision of the equation, $n=d+b$, to be done at the step n177 is for the purpose of checking whether or not the reconciliation has been completed, and since $d+b=0$ at the outset, the program step n177 is followed by the step n178 at which a decision is made as to whether the content of the register M specified by the counter b is F. If the content of the register M is found to be F signifying a void code, the program flow proceeds to the step n179 at which the display is effected to inform that the check number has been cancelled. When the user depresses the "YES" key at the step n180 having reconfirmed the content of the display at the step n179, the step n189 is carried out to clear the registers Mb and Nb specified by the counter b, to shift the specified registers M and N one row and to increment the counter d by one, followed by the return to the step n177.

On the other hand, if the content of the register Mb is found not to be the void code F at the step n178, the program flow proceeds to the step n181 at which a decision is made as to whether or not the content of the register Nb is the F code, that is, whether or not a deposit code is registered. If it is, the amount of deposited money then registered in the register Mb is displayed at the step n182 together with "OK?" asking for the user's reconfirmation. If the "YES" key is depressed at the step n184, the amount of deposited money is added to the content of the register Y and then stored in the register Y at the step n185. However, if the code registered in the register Nb is found not to be F at the step n181, the data stored in the registers Nb and Mb, that is, the number and amount of the check, are displayed at the step n183 together with "PAID?" asking the user if he or she has undoubtedly paid it. If the "YES" key is depressed at the step n186, the amount of the check is subtracted from the content of the register Y at the step n187, followed by the step n189 during which the registers Nb and Mb are reset and the registers M and N are shifted one row. Should the "NO" key be depressed at the step n186, the counter b is incremented by one and the program flow then returns to the step n177. In the manner described above, with the use of the register Y, the amount of the deposited money is added to the opening balance stored at the step n176 in the case of the registration of the deposit amount, or the amount of the check is subtracted therefrom in the case where the check has been drawn, thereby successively updating the content of the register Y. When it eventually becomes $n=d+b$ at the step n177, that is, when the necessary calculation of all of the data registered has finished, the program flow proceeds to the step n190 shown in FIG. 17(B).

Referring to FIG. 17(B) and at the step n190, the content of the counter b is transferred to the counter 6 in readiness for the next drawing of a check and the next deposit of money. At the subsequent step n191, "ENTER CHARGE" is displayed to invite the user to enter the banker's charge, followed by the step n192 during which the charge entered in the register X is subtracted from the content of the register Y and also from the current balance stored in the register P. Thereafter, "ENTER INTEREST" is displayed at the step n194 to invite the user to enter the interest, and the interest entered in the register X at the step n195 is added to the content of the register Y and also to the current balance in the register P at the step n196. The amount of money finally calculated in the manner described above and stored in the register Y is displayed at the step n197 as a new balance. When and after the user has confirmed that the new balance displayed at the step n197 is correct, he or she has to depress the "YES" key at the step n198 to make the data stored in the register O at the step n199 as an opening balance for the next month. Should the "NO" key be depressed at the step n198 in view of the new balance being incorrectly displayed at the step n197, "PLEASE REWRITE" is displayed at the step n200. Then, at the step n201, a correct value is entered in the register X and, at the step n202, the content of the register X is stored in the register Y, the program flow then returning to the step n197. The program flow from the step n198 onto the step n200 is effected when the number of items to be registered has increased while the area MA is full, when the user has failed to enter information, and/or when an error has occurred on the part of the bank. Accordingly, when the program flow proceeds from the step n198 to the step n200, the current balance can be made to coincide with that described in the banker's specification by calculating the data in the case of the increased number of items to be registered while the memory is full or by calculating the information that has not yet been entered in the case of the failure to enter it. Should no coincidence take place even though the above described efforts have been done, it can be concluded that the error has occurred on the part of the bank.

As hereinbefore described, under the RECONCILE mode, the reconfirmation of the data registered and the check of the transaction of money against the opening balance can be performed easily and accurately.

On the other hand, since the current balance is displayed at the step n102 shown in FIG. 11(B), the user can confirm the current balance before he or she actually draws the check. Specifically, since the current balance and the minimum balance are compared with each other at the step n101, and since if the former is found to be smaller than the latter, the warning is effected in terms of the display which takes place during the successive steps n125 to n128 shown in FIG. 11(E), the user can avoid the possibility of the commission being imposed as a result of the drawing of the check of an amount enough to break the minimum balance.

In addition, when the four data (current balance, opening balance, minimum balance and last check number) necessary to execute the check mode are to be entered or when the number and the amount of the check to be drawn are to be entered, are these data are, after having been entered, displayed at the successive steps n55 to n58 or at the step n111, respectively, and therefore it can readily be confirmed whether or not the data are inputted in the required registers.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. An asset control device which comprises, in combination:

an input keyboard having a plurality of input keys for entering transaction information including a money amount of a check being withdrawn, a serial number of said check, and a money amount of a deposit into a personal account;

current balance storage means, responsive to entering of said transaction information, for storing a current money balance in said personal accoount;

means for automatically updating said current money balance in said current balance storage means each time said transaction information is entered at said input keyboard;

opening balance storage means for storing an opening balance, wherein said opening balance is a balance corresponding to a balance from a previous set of completed transactions;

internal transaction storage ameans for registering a serial number of the check and the money amount thereof each time said transaction information is entered at said input keyboard, said internal transaction storage means further storing only the money amount of a deposite each time deposit transaction information is entered at said input keyboard;

calculating means for adjusting said opening balance by automatically subtracting the money amount registered in said transaction storage means from the opening balance or for automatically adding the money amount registered in said transaction storage means to the opening balance for a check being withdrawn or money being deposited into said personal account, respectively;

display means for sequentially displaying at least said transaction information being entered and for displaying an adjusted opening balance from said calculating means, said display means alternatively displaying a plurality of operating modes;

means for generating and additionally displaying said plurality of operating modes in said display means, said plurality of operating modes being for use with said device; and selector means, corresponding to at least a portion of said plurality of input keys and aligned in a one-to-one correspondence with said plurality of operating modes in said display means, for selecting one of said plurality of operating modes upon actuation of said selector means, whereby said device is operable in a selected one of said plurality of operating modes.

2. A device as claimed in claim 1, wherein said display means is further for displaying the current balance temporarily at the time the amount of the check is being entered through said input keyboard.

3. A device as claimed in claim 2, further comprising:

minimum balance storage means for storing a minimum deposited money amount entered through the input keyboard, said minimum deposited money amount being an arbitrarily preset minimum which is required to be maintained in the personal account, means for comparing said preset minimum balance and said current balance, and warning means, responsive to said means for comparing, for automatically indicating when the preset minimum balance is greater than the current balance.

4. A device as claimed in claim 3, wherein said input keyboard includes a confirmation key, and wherein said means for displaying further displays all of the transaction information which has been entered through said input keyboard, together with the type of transaction, said confirmation key being used to invite the user of the device to reconfirm the contents being displayed.

5. A device as claimed in claim 2, wherein said input keyboard includes a confirmation key, and wherein said means for displaying further displays all of the transaction information which has been entered through said input keyboard, together with the type of transaction, said confirmation key being used to invite the user of the device to reconfirm the contents being displayed.

6. A device as claimed in claim 1, further comprising:

minimum balance storage means for storing a minimum deposited money amount entered through the input keyboard, said minimum deposited money amount being an arbitraily preset minimum which is required to be maintained in the personal account, means for comparing said preset minimum balance and said current balance, and warning means, responsive to said means for comparing, for automatically indicating when the preset minimum balance is greater than the current balance.

7. A device as claimed in claim 3, wherein said input keyboard includes a confirmation key, and wherein said means for displaying further displays all of the transaction information which has been entered through said input keyboard, together with the type of transaction, said confirmation key being used to invite the user of the device to reconfirm the contents being displayed.

8. A device as claimed in claim 1, wherein said input keyboard includes a confirmation key, and wherein said means for displaying further displays all of the transaction information which has been entered through said input keyboard, together with the type of transaction, said confirmation key being used to invite the user of the device to reconfirm the contents being displayed.

9. A device as claimed in claim 1, wherein said plurality of operating modes include a check mode for writing checks, a credit card mode for payment on credit card purchases, and a calculator mode.

* * * * *